S. E. T. DODSON.
Apple-Parers.

No. 153,760.  Patented Aug. 4, 1874.

WITNESSES:  Fig. 4.  INVENTOR:
A. Bennerendorf.  S. E. T. Dodson
Sedgwick.  BY
  ATTORNEYS.

THE GRAPHIC CO. PHOTO-LITH. 39 & 41 PARK PLACE, N.Y.

UNITED STATES PATENT OFFICE.

SOLOMON E. T. DODSON, OF STEUBENVILLE, KENTUCKY.

IMPROVEMENT IN APPLE-PARERS.

Specification forming part of Letters Patent No. 153,760, dated August 4, 1874; application filed April 25, 1874.

*To all whom it may concern:*

Be it known that I, SOLOMON E. T. DODSON, of Steubenville, in the county of Wayne and State of Kentucky, have invented a new and Improved Apple-Parer, of which the following is a specification:

This invention consists of forks arranged on a revolving reel, to be presented in succession to the driving-wheel and cutters, to allow of removing the pared apples and putting others onto some forks, while others are performing work.

It also consists of automatic trip and spring mechanism which throw the forks and cutters out, and stop them when the apples are pared, and release the reel from its stop mechanism, to allow it to be shifted to remove the pared apples and present others to the cutters to be pared.

It also consists of a contrivance on the reel for automatically gearing the cutters and fork again, when it is shifted; and it also consists of a sliding carrier for the knives, worked by a crank-shaft gearing with the driving-shaft, and mounted on the trip-slide, by which the reel is locked for being geared by the reel when it is shifted to change the forks.

Figure 1:
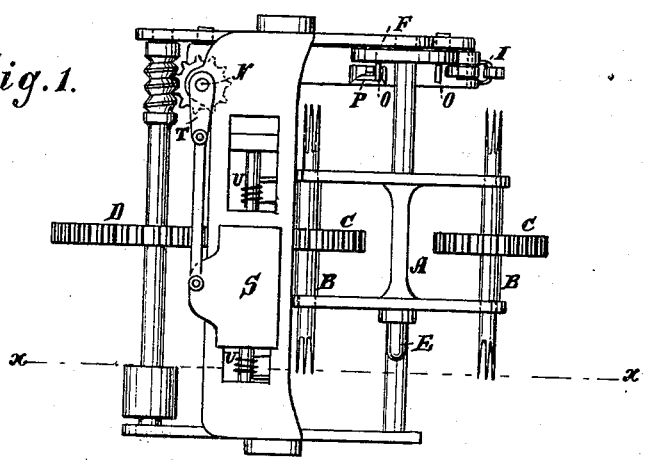
Figure 2:
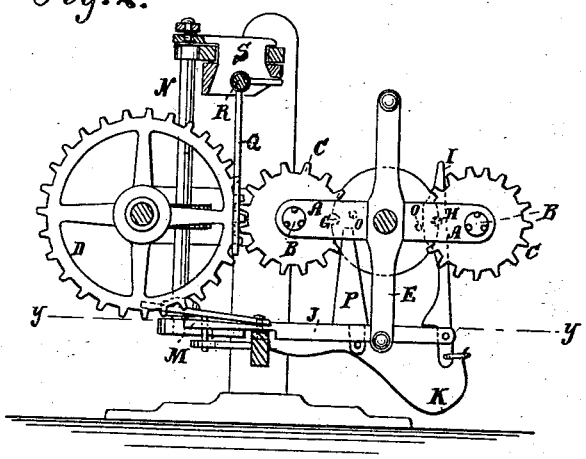
Figure 3:
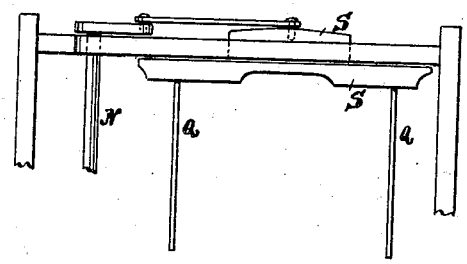
Figure 3:
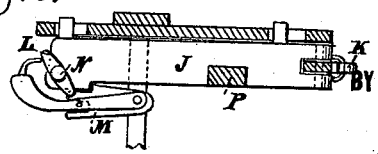

Figure 1 is a plan view of my improved machine. Fig. 2 is a sectional elevation taken on the line *x x*, of Fig. 1. Fig. 3 is a side elevation of some of the parts. Fig. 4 is a detail horizontal section on line *y y* of Fig. 2.

Similar letters of reference indicate corresponding parts.

A represents the reel, carrying two double forks, B, on opposite sides, each having a pinion, C, to gear with the driving-wheel D. The reel-shaft has a hand-crank, E, at one end, for turning it, and at the other end it carries a disk, F with notches G in the periphery, to be locked by a stop-pin, H, on a spring-actuated pawl, I, which is pivoted on the slide J, and has a spring, K, for pressing the stop-pin into the notches. The spring is also to throw the slide forward to the right to unlock the reel when it is to be shifted, and ungear the forks from the driving-wheel, said slide being tripped so as to allow the spring to act by a cam, L, on the crank-shaft N, which slides the cutters by throwing off the holding-catch M when the cutters have passed over the apples. The disk F has also stud-pins O, which push the slide back again, and gear the forks with the driving-wheel, by acting against the stud P when the reel is shifted. The cutters, which may be of any approved kind, are attached to the rods Q, which are suspended from the shaft R, mounted in the slide S, which is worked by the crank T on the shaft N. Said cutters are pressed against the apples by springs U.

In this example two fork-spindles are arranged on the reel, but it is evident that four or more may be employed, according to the size of the reel. The knives may be caused to traverse by other means, if preferred.

Having thus described my invention, I claim as new and desire to secure by Letters Patent—

1. In a machine for paring fruit, the revolving frame or reel A, provided with two or more forks or rotary fruit-holders, B, mounted in the reel to adapt said fruit-holders to be presented in successive order to the paring and operative mechanism, as herein shown and described, and for the purpose specified.

2. In combination with the revolving fork frame, the locking-disk F, pawl or dog I, spring K, slide J, and trip-catch M, arranged in co-operative relation to the paring or cutting mechanism, substantially as herein described.

3. The stud-pins O on the locking-disk F, in combination with the studs P, slide J, and spring-catch M, substantially as specified.

4. In combination with the cutting mechanism, the vertical cutter-driving shaft N, cam L, slide J, and trip-catch M, substantially herein set forth.

SOLOMON E. T. DODSON.

Witnesses:
JAS. S. McGEE,
A. J. DODSON.